(12) United States Patent
Deiana

(10) Patent No.: US 11,415,116 B2
(45) Date of Patent: Aug. 16, 2022

(54) DEEP OCEAN WATER FLOW ACCELERATOR

(71) Applicant: Salvatore Deiana, Vancouver (CA)

(72) Inventor: Salvatore Deiana, Vancouver (CA)

( * ) Notice: Subject to any disclaimer, the term of this patent is extended or adjusted under 35 U.S.C. 154(b) by 0 days.

(21) Appl. No.: 17/335,255

(22) Filed: Jun. 1, 2021

(65) Prior Publication Data

US 2021/0381496 A1 Dec. 9, 2021

Related U.S. Application Data

(60) Provisional application No. 63/036,040, filed on Jun. 8, 2020.

(51) Int. Cl.
  *F03G 7/05* (2006.01)
  *F03B 13/14* (2006.01)

(52) U.S. Cl.
  CPC .............. *F03G 7/05* (2013.01); *F03B 13/142* (2013.01); *Y02E 10/30* (2013.01)

(58) Field of Classification Search
  CPC ........... F03G 7/05; F03B 13/142; Y02E 10/30
  USPC ...................................... 60/641.7; 290/42, 53
  See application file for complete search history.

(56) References Cited

U.S. PATENT DOCUMENTS

| | | | | |
|---|---|---|---|---|
| 3,064,137 A | * | 11/1962 | Corbett, Jr. .......... | H02K 7/1853 290/53 |
| 4,383,413 A | * | 5/1983 | Wells .................... | F03B 13/142 60/497 |
| 4,384,459 A | * | 5/1983 | Johnston ................... | F03G 7/05 60/641.7 |
| 5,770,893 A | * | 6/1998 | Youlton .................. | F03B 13/24 290/53 |
| 2019/0353139 A1 | * | 11/2019 | Sheldon-Coulson ........ | H02K 7/1823 |

* cited by examiner

*Primary Examiner* — Hoang M Nguyen
(74) *Attorney, Agent, or Firm* — Donald R. Boys; Central Coast Patent Agency LLC

(57) ABSTRACT

A deep ocean water extraction apparatus has a collection pool having an outer shell with a maximum diameter, a lesser diameter at a mostly closed bottom, and an open top of a diameter smaller than the maximum diameter, outflow tubes with pumps extending horizontally from an opening through a side wall of the shell, an opening through the bottom covered by a rigid disk having a plurality of tube openings through which descending collection tubes of common length are connected, and flotation elements attached to the descending collection tubes at a plurality of points spaced down the depth of the collection tubes. The apparatus is characterized in that water is pumped out of the collection pool, and common pressure on the surfaces of the collection pool and the surrounding ocean water, causes water to flow up the collection tubes into the collection pool.

11 Claims, 7 Drawing Sheets

ND WATER FLOW
DEEP OCEAN WATER FLOW ACCELERATOR

CROSS-REFERENCE TO RELATED APPLICATIONS

The present case claims priority to provisional patent application 63/036,040, filed Jun. 8, 2020. All disclosure of the parent case is incorporated at least by reference.

BACKGROUND OF THE INVENTION

1. Field of the Invention

The present invention is in the technical area of harvesting water from deep in the ocean.

2. Description of Related Art

It is known in the art to harvest water from depths in the ocean and to use the water harvested for various purposes: generate electricity using an OTEC system, using deep ocean water (DOW) to climatize offices and residences and also re-establish climate lost to global warming in agritechnology.

Warm tropical surface water and deep ocean water are needed together to run a thermal energy conversion loop that generates electricity, this system is called OTEC for ocean thermal energy conversion.

Commercial facilities for extracting water from deep in the ocean are prone to failure from wave action and storms. The present inventor believes that there is better apparatus and methods for extracting deep ocean water, and innovative apparatus and methods are described in this application in enabling fashion.

BRIEF SUMMARY OF THE INVENTION

In one embodiment of the invention deep ocean water extraction apparatus is provided, comprising a collection pool having an outer shell of round horizontal cross section, having a maximum diameter between an uppermost extent and a lowermost extent, a lesser diameter at a mostly closed bottom at the lowermost extent, and an open top of a diameter smaller than the maximum diameter, one or more outflow tubes associated each with an outflow pump, each outflow tube extending horizontally from an opening through a side wall of the shell of the collection pool, an opening through the bottom covered by a rigid disk having a plurality of tube openings through which descending collection tubes of polymer material are connected, one per tube opening, the descending collection tubes having a common length, and a plurality of flotation elements attached to the descending collection tubes at a plurality of points spaced down the depth of the collection tubes. The apparatus is characterized in that water is pumped out of the collection pool through the one or more outflow tubes, and common pressure on the surface of the collection pool and the surrounding ocean water, by virtue of the open top of the collection pool causes water to flow up the collection tubes into the collection pool at a rate to match the rate of flow of water pumped out, keeping the water level in the collection pool the same as the water level of the surrounding ocean water.

In one embodiment the collection pool further comprises an internal cylindrical shell of the same material as the outer shell, the internal cylindrical shell having a diameter of the open top, and extending to the bottom, creating a closed volume between an outer diameter of the internal cylindrical shell and the inside of the outer shell of the collection pool, this closed volume filled with a substance of lighter mass than the material of the outer shell and the inner cylindrical shell, enhancing buoyancy of the collection pool. Also, in one embodiment the outer shell and inner cylinder of the collection pool comprises reinforced concrete and the closed volume of lighter material comprises Styrofoam™, which is a trademarked brand of closed-cell polystyrene foam (XPS). In one embodiment the apparatus further comprises a plurality of composite cords attached firmly to an anchor point centered on the rigid disk covering the bottom opening, with one composite cord entering and passing down full length of each descending tube to and through a bottom anchor element filled with a material of high mass, the composite cords tied or otherwise secured to the bottom anchor element. And in one embodiment each composite cord is made of a combination of Nylon™, which is a generic designation for a family of synthetic polymers composed to polyamides, and is a silk-like thermoplastic, generally made from petroleum, and graphene carbon.

In one embodiment of the apparatus the maximum diameter and the height are at least 150 meters, and the open top has a diameter of less than the maximum diameter. Also, in one embodiment one or more of the outflow tubes connect to an Ocean Thermal Energy Conversion plant, providing cold deep ocean water to the plant for use in generating electrical energy. Also, in one embodiment the flotation elements are constructed with an outer shell of reinforced concrete and an inner lighter mass material. In one embodiment the lighter mass material is Styrofoam™. And in one embodiment the descending collection tubes extend to a depth of at least 600 meters.

In one embodiment the apparatus further comprises a flotation collar of a diameter greater than the maximum diameter of the collection pool, connected to the collection pool by a circular web and having an outer flotation ring with a shell of reinforced concrete and an inner filling of a lighter mass material, the flotation collar providing stability and a flotation height above the ocean water level for the collection pool. And in one embodiment all deep ocean water surfaced must be exposed to atmospheric pressure before proceeding to utilization.

DETAILED DESCRIPTION OF THE INVENTION

Figure 1:
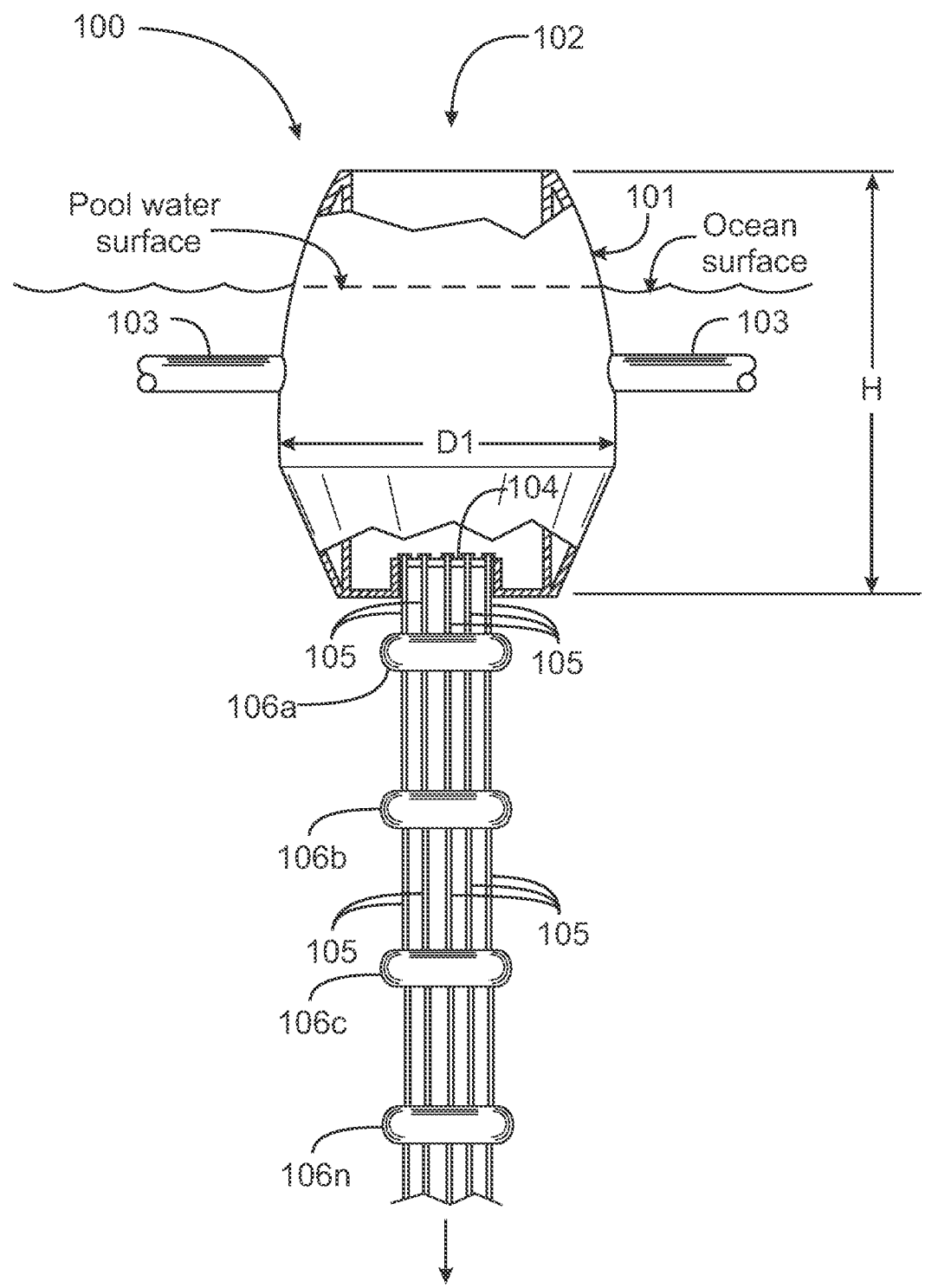
FIG. 1 is an elevation view of an apparatus in an embodiment of the present invention for extracting deep ocean water.

FIG. 1 is an elevation view of an apparatus 100 in an embodiment of the present invention for extracting deep ocean water. Apparatus 100 comprises an infinity pool 101 with an open top 102, the infinity pool shown at an upper and a lower region in partial cross section. The walls of this pool in one embodiment are composed of a cement material to provide maximum resistance to the corrosive effects of seawater, and great strength to avoid damage to the structure and a solid core of Styrofoam™ to keep it afloat.

At a lower extremity infinity pool 101 there is an opening covered by a metal disk 104, that holds ends of a plurality of tubes 105. Tubes 105 are made of material that is impervious to the ravages of ocean water, such as polyvinyl chloride or any one of several polymer materials and extend vertically downward to the ocean floor, or to a desired depth for extraction, which may be as much as 600 meters or even over 1000 meters.

Tubes 105 are held together by a continuous sequence of flotation elements 106a, 106b, to 106n and more, throughout the length of the tubes. The flotation elements are shaped like donuts in this example but might have other shapes in other embodiments. The flotation elements may be hollow in some embodiments but are preferably solid donuts of a material difficult to crush but lighter than water as for example Styrofoam™. In some embodiments one or more elements 106 at or near the lowermost extent of tubes 105 may be filled with lead or other heavy material to serve to anchor the apparatus and keep the tubes straight. Anchor elements may also take other forms than the shape of the flotation elements.

The floatation elements have a purpose to hold the tubular structure together and at the same time to support the weight of the tubular structure that in many cases will be much more than the total weight of the rest of the apparatus.

The inventor is aware that conventional design of such an apparatus typically has a single tube or pipe of large diameter, up to ten meters in diameter or more in some circumstances. Such an implementation poses a considerable weakness to currents and wave action and may cause frequent damage requiring repair and down time. In the instant invention tubes 105 are capable of delivering a greater resistance to currents and wave action because the tubular structure occupies a much larger area than a single tube while at the same time using smaller tubes offering less resistance than a big single tube.

The present technology of an OTEC is extracting deep ocean water and connecting this water flow directly into an OTEC. This procedure limits the amount of deep ocean water extractable to the size of the tube however big it is. The inventor on the contrary proposes smaller tubes that are easy to handle and assemble and that have an advantage over the present technology because the apparatus in embodiments of the invention can extract much more deep ocean water at an accelerated flow rate.

This flow rate acceleration is caused by atmospheric pressure. The inventor proposes that the deep ocean water extracted be collected into an open air floating pool the inventor terms an Infinity Pool, whose internal water level is the same as the sea level and from this pool the deep ocean water is fed into the OTEC.

Because the pool is exposed to atmospheric pressure if one water pump alone is used to feed the OTEC the rate of water flow surfacing from the depth of the ocean will be limited to the size of the water used, but if we add one two or more water pumps to feed the OTEC, atmospheric pressure will accelerate the flow of surfacing water to equalize promptly the difference in levels between the sea level and the internal level of the Infinity Pool. Because of the atmospheric pressure action on the open air floating pool's level, the number of outflow tubes removing deep ocean water can be unlimited and will correspond to an equivalent acceleration.

This acceleration that enables an unlimited quantity of extracted deep ocean water allows the apparatus to feed an equally large number of OTECS. The hydrodynamics of this apparatus is provided by a deep funnel shape for the pool, deeply rooted into the ocean and emerging above the sea surface. The funnel shape limits resistance to vertical motion of waves in a storm situation.

In the apparatus of FIG. 1 a plurality of outflow tubes 103 are engaged to the container of the infinity pool, and these tubes are connected to pumping apparatus, not shown, that is operated to draw extracted water from the infinity pool and deliver same to containers and reservoirs also not shown, or directly to one or more OTEC systems. Two such outflow tubes 103 are shown in FIG. 1 but in some embodiments of the invention there may be many more. Every additional outflow tube increases the flow rate at which deep ocean water in the infinity pool may be collected.

In FIG. 1 an ocean surface is indicated at the level that will attain given the buoyancy of the pool apparatus. As deep ocean water in the Infinity Pool is pumped out the level of water (pool water surface) will tend to fall, but the action of atmospheric pressure on the open surface will draw more water up from the deep ocean and the levels will tend to stay the same.

The Infinity Pool in embodiments of the invention may be implemented in many different forms and sizes. In one example D1 may be as much as 200 meters, and H might be also as much as 200 meters or more.

Figure 2:
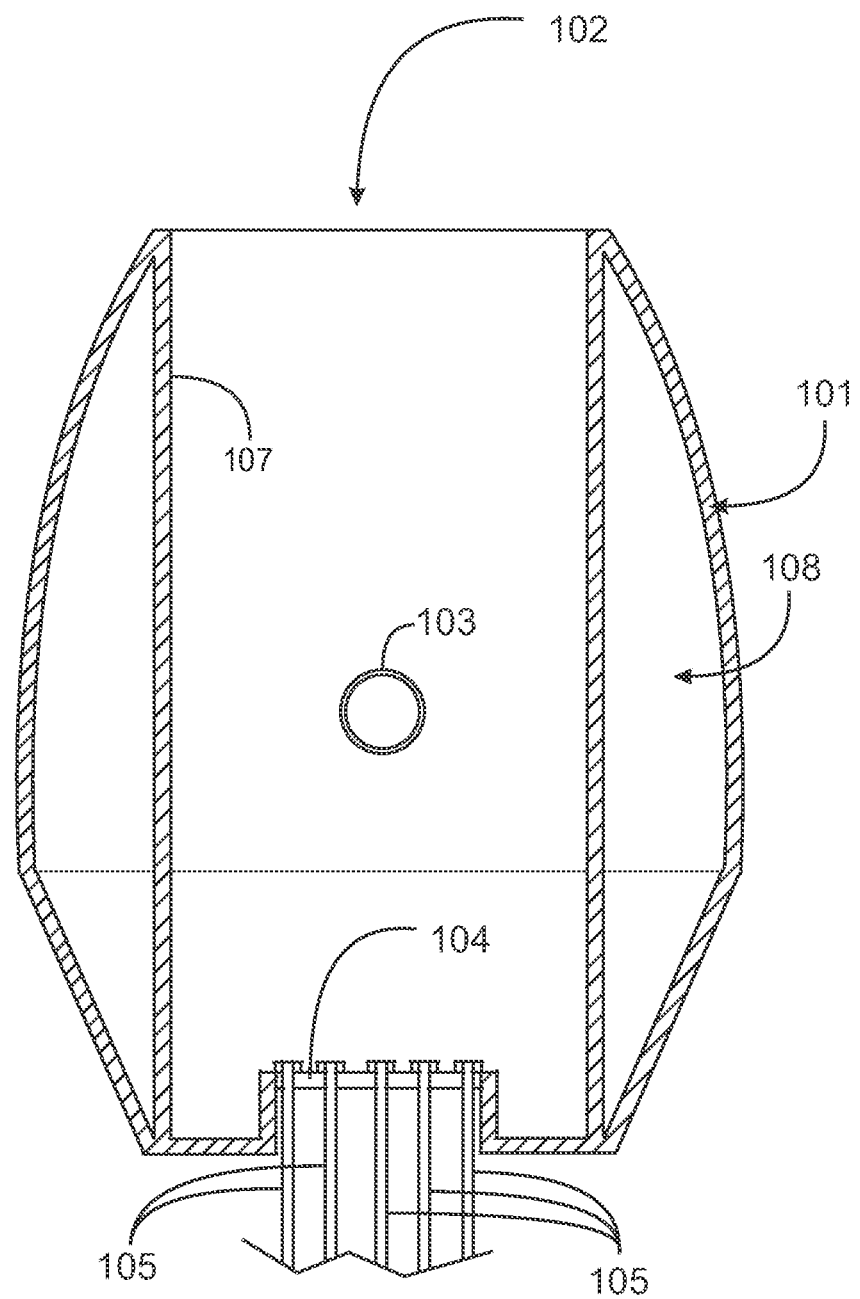
FIG. 2 is a cross section view of the apparatus of FIG. 1.

FIG. 2 is a sectioned view of infinity pool 101, to provide exemplary detail of the inside of the infinity pool in embodiments of the invention. Disk 104 with openings for the descending tubes 105 is clearly seen, as is the entrance opening for one of the outflow tubes 103. In the instant embodiment the structure of pool 101 is in a double wall wherein the walls are in one example reinforced concrete, with an inner cylinder 107 that provides an inner volume 108 that in this embodiment is filled with Styrofoam™ or another light material. Although the pool will be buoyant if volume 107 is not filled, filling provides additional strength.

Figure 3:
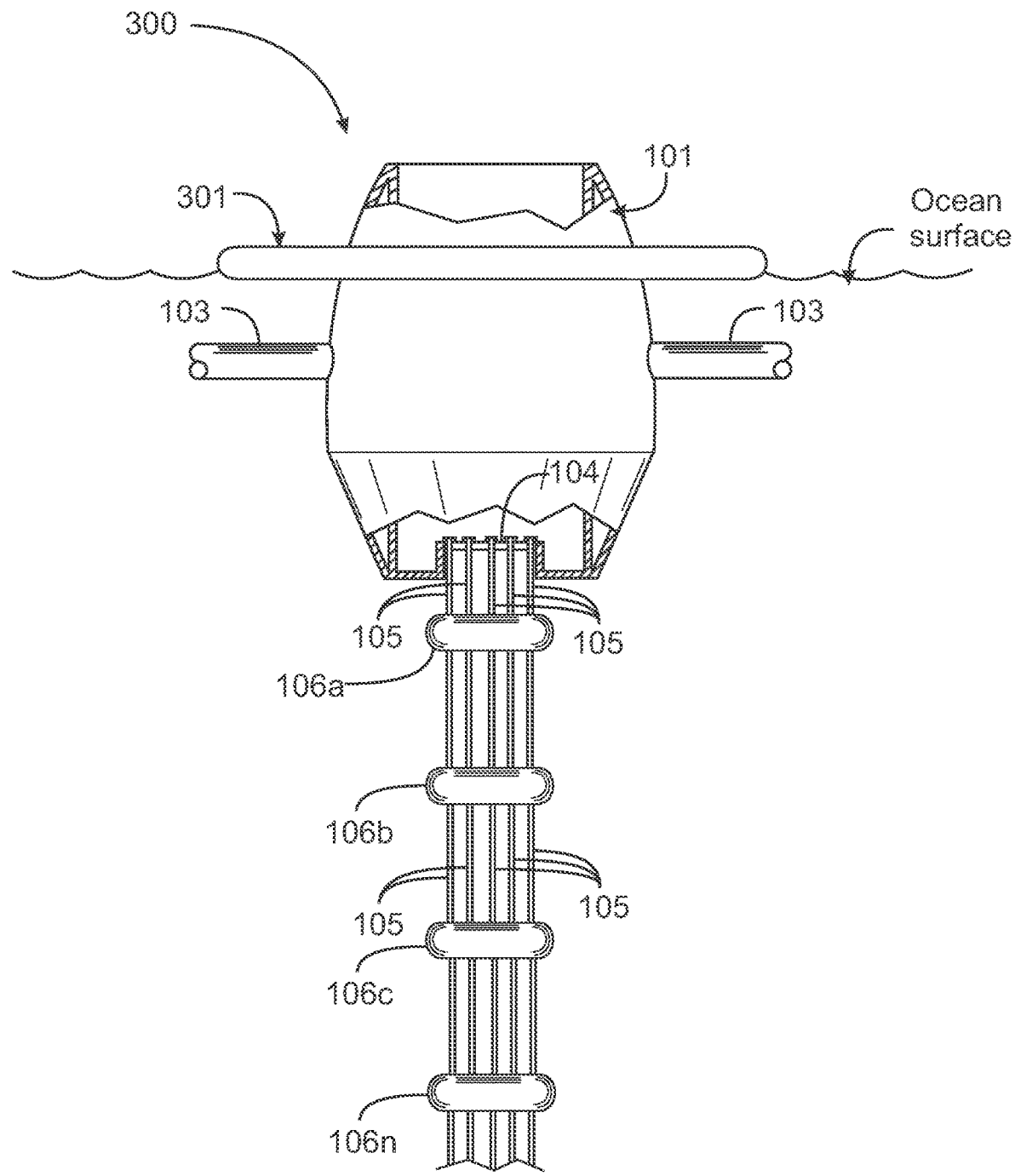
FIG. 3 is an elevation view of an apparatus in an alternative embodiment of the invention.

FIG. 3 is an elevation view of an Infinity Pool 300 in an alternative embodiment of the invention. A salient difference between the apparatus of FIG. 1 and that of FIG. 3 is that the apparatus of FIG. 3 has a flotation collar 301 surrounding and joined to the outer wall of the Infinity Pool. An important purpose of this flotation collar is to provide additional stability and buoyancy to the Infinity Pool of the apparatus of FIG. 3.

Figure 4:
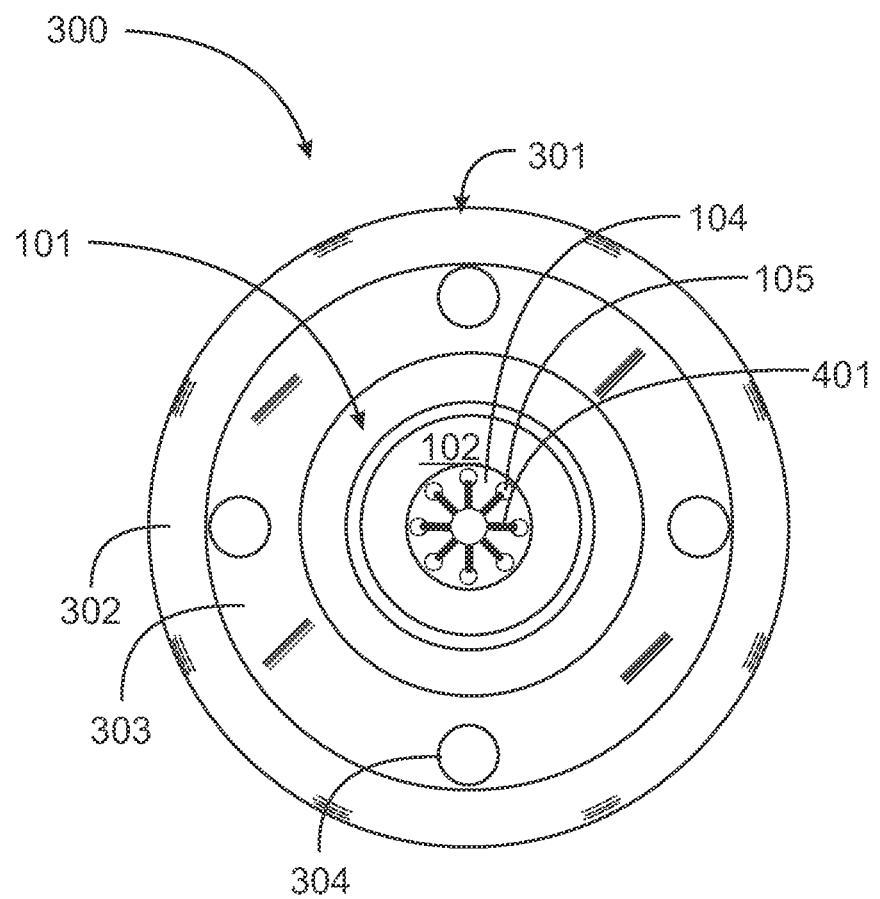
FIG. 4 is a plan view of the apparatus of FIG. 3.

FIG. 4 is a plan view of the Infinity Pool of FIG. 3. Flotation collar 301 is seen to have flotation element 302 in a shape of a donut in this example, which element may have an outer wall of concrete and an inner Styrofoam™ filling. The flotation element 302 is joined to body 101 of the Infinity Pool by a web 303 which, in this example has four through holes 304 spaced at ninety degrees. Disk 104 located in the bottom of the Infinity Pool may be seen through opening 102, with ends of tubes 105 through the disk. Special cords 401, in one embodiment made of a fabric, formed from a combination of Nylon™ and Graphene Carbon, are secured to an anchor point at the center of disk 104 and pass into and down the full length of each tube 105. An important purpose of cords 401 is to secure the assembly of the descending tubes 105 and flotation elements 106.

Figure 5A:
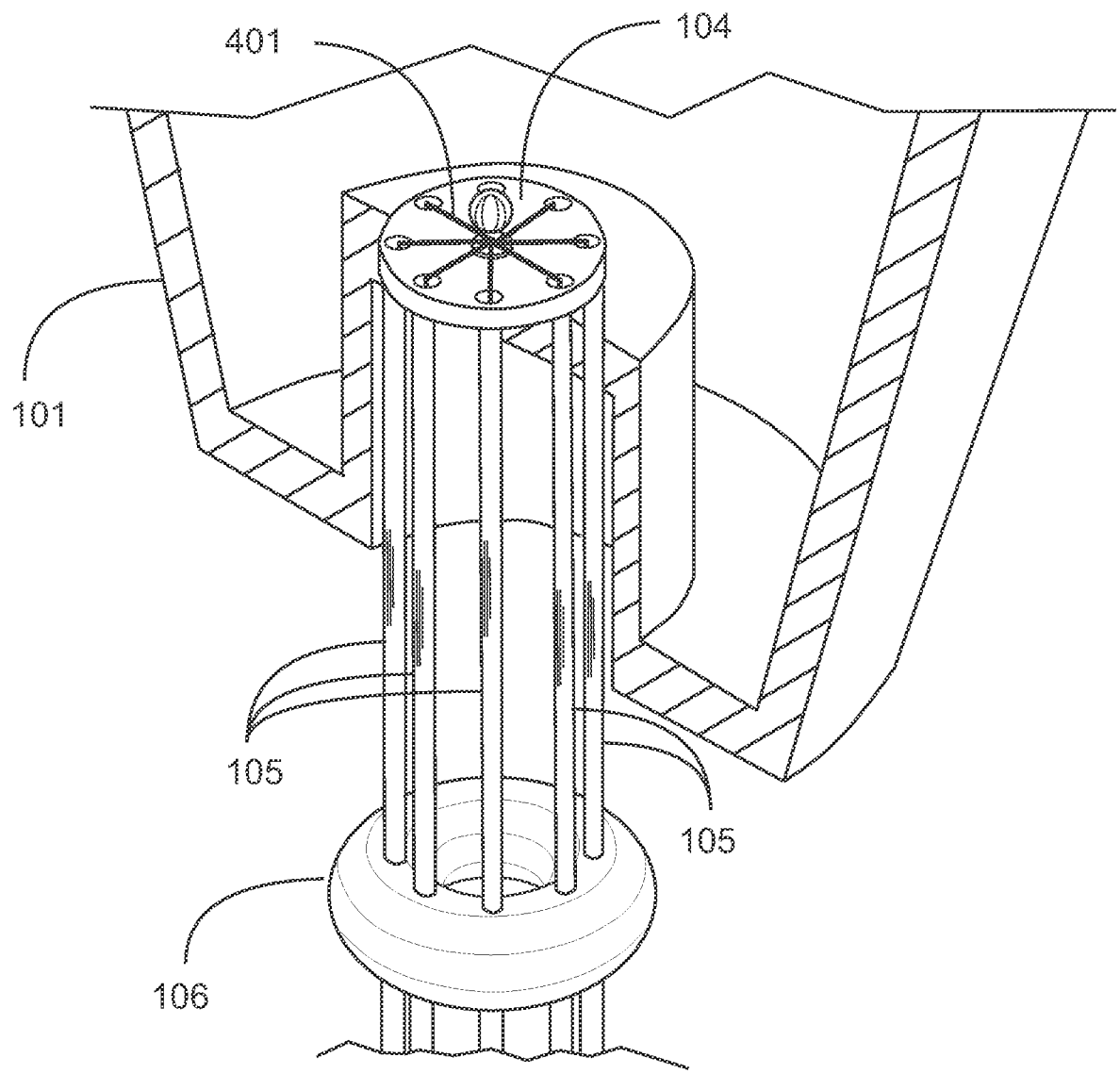
FIG. 5A is a perspective view of a means of constraining tubes and flotation elements to a disk in a lower part of an Infinity Pool in an embodiment of the invention.
Figure 5B:
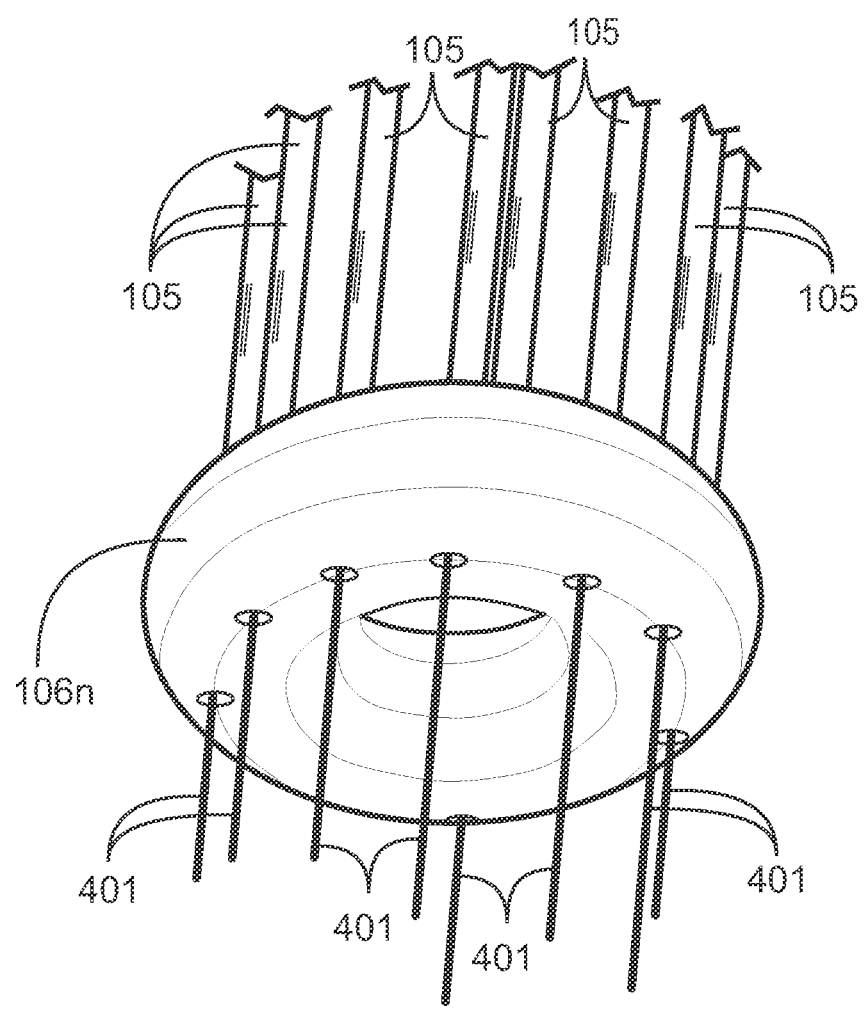
FIG. 5B is a perspective view of cords passing through a bottom element of the apparatus of FIG. 1.
Figure 5C:
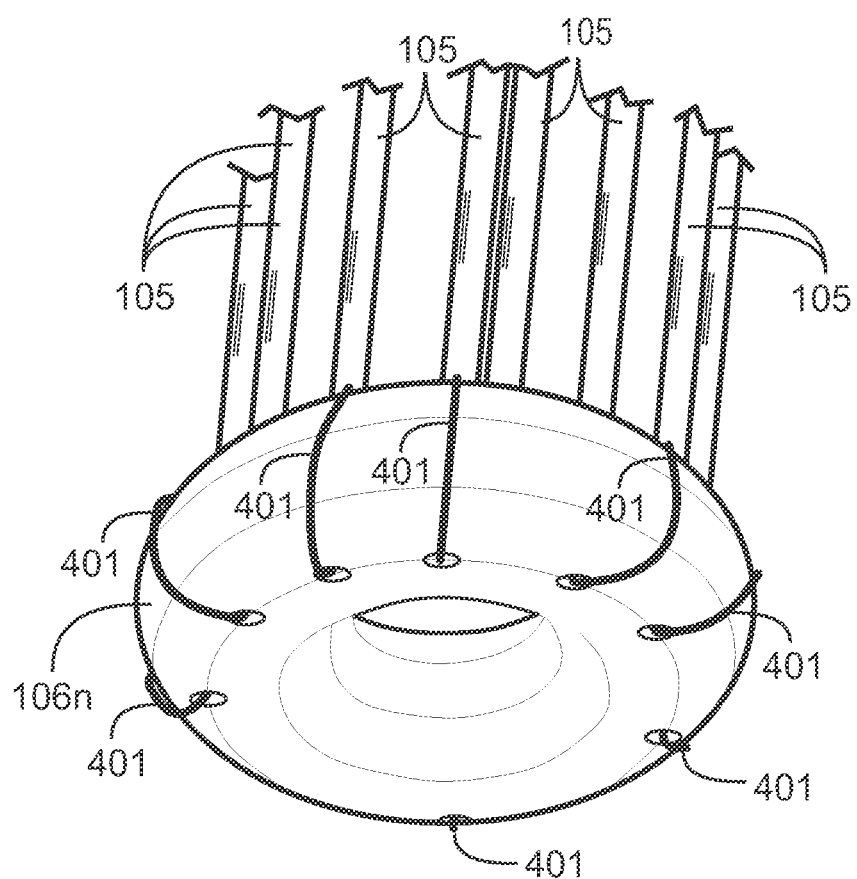
FIG. 5C is a perspective view of the elements of FIG. 5B showing means of securing cords.

FIG. 5A is a perspective view of disk 104 inside infinity pool 101 again showing cords 401 anchored and passing into and down each tube 105 through flotation elements 106. FIG. 5B is a perspective view illustrating a bottom element 106n which, as described above, may be filled with a heavy element like lead to provide anchoring function for the apparatus. Tubes 105 are shown passing through element 106n and cords 401 are shown extending through element 106n. FIG. 5C shows cords 401 drawn up around element 106n. The cords are securely anchored to element 106n by tying to to tubes on the top, by wrapping on around element 106n and tying to themselves, or by any other method to secure the cords to element 106n.

One important purpose for apparatus 100 is to provide deep ocean water to Ocean Thermal Energy Conversion (OTEC) plants which may also be floating on the ocean surface nearby to apparatus 100 in embodiments of the invention which extracts the deep ocean water through pumps in outflow tubes 103. Two such outflow tubes are shown in FIG. 1, but there may a considerably larger number.

In conventional apparatus, as stated above, a single descending tube is used which may be as much as ten meters in diameter or more. The inventor proposes smaller tubes as illustrated and described above. The plurality of smaller tubes may be in one embodiment from 1 to three meters in diameter each. This is not a limiting dimension, because in different embodiments different diameters may be used. The depth of the descending tubes may be as much as 600 meters to 1000 meters or more.

In embodiment of the present invention the diameter D1 as seen in FIG. 1 may be, for example, 200 meters. The open top 102 may be a somewhat smaller diameter, such as 180 meters, and could be smaller. The height of the Infinity Pool may be similar to the diameter, say 200 meters, but in some embodiments may be considerably more to create an Infinity Pool much taller than it is wide.

The open top is to be sure the surface of the water in the Infinity Pool is subject to local atmospheric pressure exactly as is the surrounding ocean surface. The deep ocean water extracted is collected the open-air floating called' Infinity Pool described above in enabling detail. The internal water level in the Infinity Pool is the same as the level of the surrounding sea water, and from this pool the deep ocean water is fed into the OTEC. Because the Infinity Pool is exposed to atmospheric pressure, if one water pump alone is used to feed a connected OTEC the rate of water flow surfacing from the depth of the ocean will be limited to the rate of water pumped out to the OTEC. If additional outflow pumps are used feed the same or other OTECs, the common pressure on the water surface of the Infinity Pool and the surrounding ocean water will ensure that the rate of flow of deep ocean water up the plurality of tubes will accelerate to keep the water level in the Infinity Pool common to the surrounding ocean water.

In reasonable use the apparatus of the invention in different embodiments may be constructed in such as a shipyard and launched much as would a large ocean-going vessel. Once launched the apparatus may be towed to a geographical point of use and deployed. Outflow tubes may be added and connected to OTECs or other use apparatus, and the system put into use.

A person of ordinary skill will realize that all embodiments described above are entirely exemplary, and not limiting to the scope of the invention. The scope is limited only by the claims.

The invention claimed is:

1. A deep ocean water extraction apparatus, comprising:
   a collection pool having an outer shell of round horizontal cross section, having a maximum diameter between an uppermost extent and a lowermost extent, a lesser diameter at a mostly closed bottom at the lowermost extent, and an open top of a diameter smaller than the maximum diameter;
   one or more outflow tubes associated each with an outflow pump, each outflow tube extending horizontally from an opening through a side wall of the shell of the collection pool;
   an opening through the bottom covered by a rigid disk having a plurality of tube openings through which descending collection tubes of polymer material are connected, one per tube opening, the descending collection tubes having a common length; and
   a plurality of flotation elements attached to the descending collection tubes at a plurality of points spaced down the depth of the collection tubes;
   characterized in that water is pumped out of the collection pool through the one or more outflow tubes, and common pressure on the surface of the collection pool and the surrounding ocean water, by virtue of the open top of the collection pool causes water to flow up the collection tubes into the collection pool at a rate to match the rate of flow of water pumped out, keeping the water level in the collection pool the same as the water level of the surrounding ocean water.

2. The apparatus of claim 1 wherein the collection pool further comprises an internal cylindrical shell of the same material as the outer shell, the internal cylindrical shell having a diameter of the open top, and extending to the bottom, creating a closed volume between an outer diameter of the internal cylindrical shell and the inside of the outer shell of the collection pool, this closed volume filled with a substance of lighter mass than the material of the outer shell and the inner cylindrical shell, enhancing buoyancy of the collection pool.

3. The apparatus of claim 2 wherein the outer shell and inner cylinder of the collection pool comprises reinforced concrete and the closed volume of lighter material comprises closed-cell excluded polystyrene foam (XPS).

4. The apparatus of claim 1 further comprising a plurality of composite cords attached firmly to an anchor point centered on the rigid disk covering the bottom opening, with one composite cord entering and passing down full length of each descending tube to and through a bottom anchor element filled with a material of high mass, the composite cords tied or otherwise secured to the bottom anchor element.

5. The apparatus of claim 4 wherein each composite cord is made of a combination of synthetic polymers composed of polyamides and graphene carbon.

6. The apparatus of claim 1 wherein the maximum diameter and the height are at least 150 meters, and the open top has a diameter of less than the maximum diameter.

7. The apparatus of claim 1 wherein one or more of the outflow tubes connect to an Ocean Thermal Energy Conversion plant, providing cold deep ocean water to the plant for use in generating electrical energy.

8. The apparatus of claim 1 wherein the flotation elements are constructed with an outer shell of reinforced concrete and an inner lighter mass material.

9. The apparatus of claim 8 wherein the lighter mass material is closed-cell extruded polystyrene foam (XPS).

10. The apparatus of claim 1 wherein the descending collection tubes extend to a depth of at least 600 meters.

11. The apparatus of claim 1 further comprising a flotation collar of a diameter greater than the maximum diameter of the collection pool, connected to the collection pool by a circular web and having an outer flotation ring with a shell of reinforced concrete and an inner filling of a lighter mass material, the flotation collar providing stability and a flotation height above the ocean water level for the collection pool.

* * * * *